June 13, 1950 J. SCHOENFELD 2,511,791
POT DRAINER
Filed March 28, 1947 2 Sheets-Sheet 1
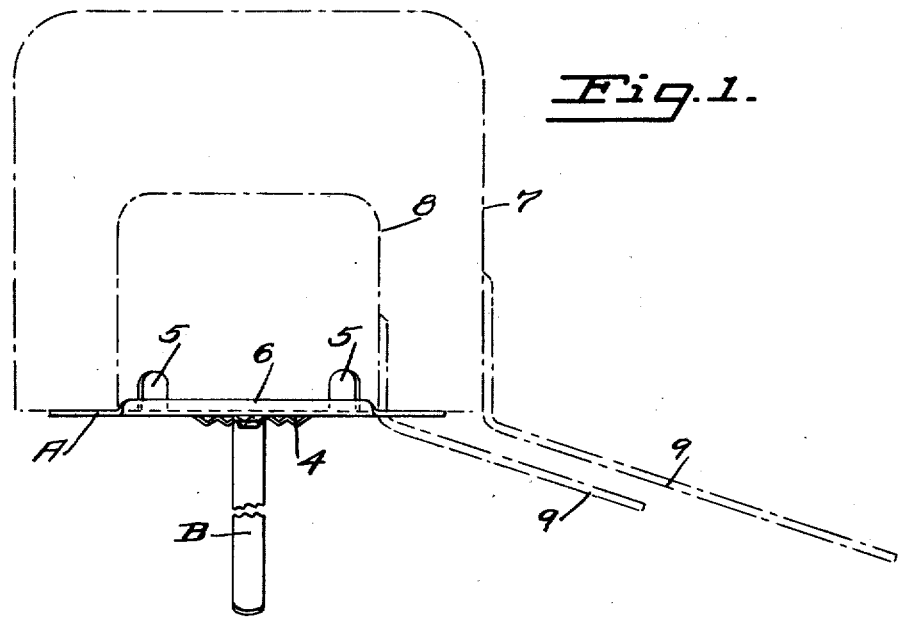
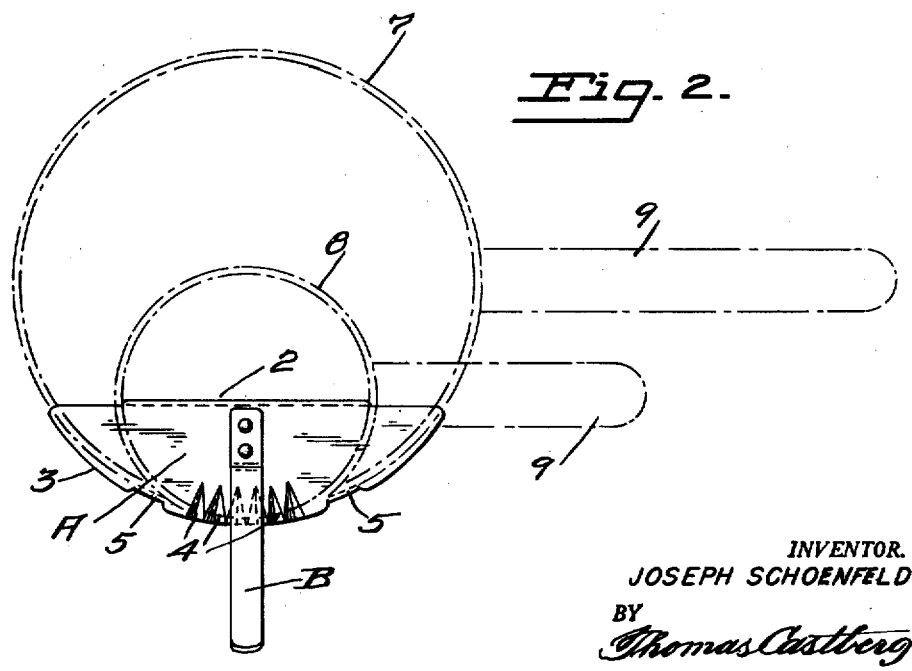
INVENTOR.
JOSEPH SCHOENFELD
BY
Thomas Austberg
ATTORNEY.

June 13, 1950 J. SCHOENFELD 2,511,791
POT DRAINER
Filed March 28, 1947 2 Sheets-Sheet 2
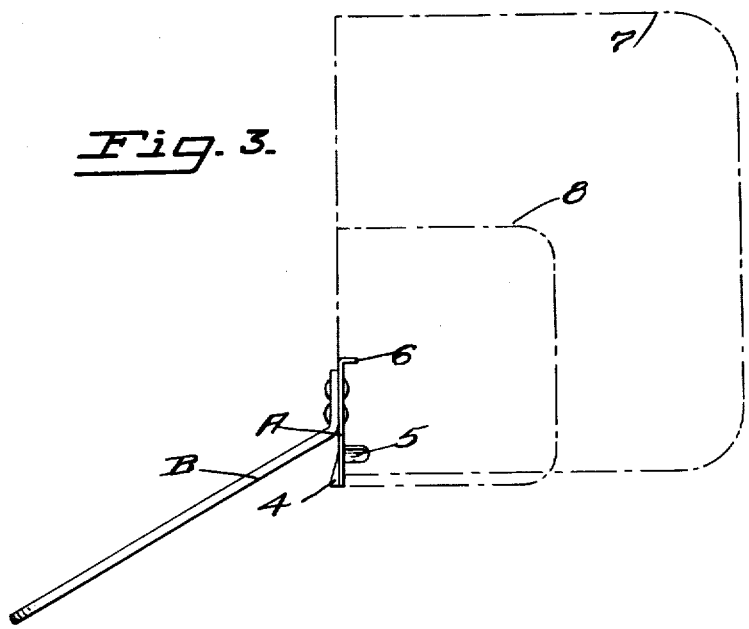
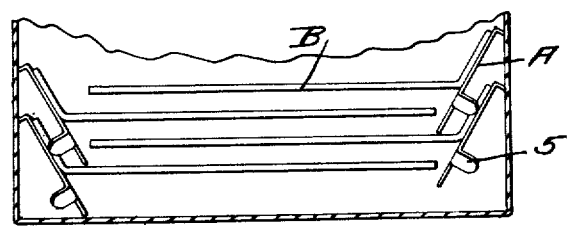
INVENTOR.
JOSEPH SCHOENFELD
BY Thomas Castberg
ATTORNEY Patented June 13, 1950

2,511,791

UNITED STATES PATENT OFFICE 2,511,791

POT DRAINER

Joseph Schoenfeld, Larkspur, Calif.

Application March 28, 1947, Serial No. 737,744

2 Claims. (Cl. 210—163.5)

This invention relates to a pot drainer to facilitate the draining of fluid from cooking vessels.

Cooking vessels, after the contents have been cooked, are usually drained by grasping the handle of the vessel with one hand while the other hand holds the cover loosely in place so that the water may drain off and at the same time prevent the contents from spilling out. This is often a difficult task as the pot or vessel to be drained may be fairly large. It is obviously heavy due to its contents plus the water to be drained off. That is, all the weight is imposed on one hand as the other hand only holds the cover loosely in place. Furthermore, the hand holding the cover is directly in the path of the rising steam and a burn may result.

The object of the present invention is to provide a pot drainer which does away with an ordinary cover when draining a pot; to provide a pot drainer having a handle extending sufficiently far away from the pot to prevent injury to the hand holding the pot drainer by scalding steam; to provide a pot drainer which has lugs formed thereon engaging the pot in such a manner that the weight of the pot and its contents may be supported substantially equally by both hands when drained; to provide a pot drainer that can readily be applied to different size pots without requiring mechanical adjustment and which will fit equally well small, large and intermediate size pots; to provide a pot drainer which will concentrate the draining liquid to a compartively narrow stream to facilitate pouring into small containers; to provide a pot drainer having a handle projecting on an angle therefrom so as to enable nesting of the pot drainers for compact packaging and shipping; to provide a pot drainer having a handle disposed on such an angle as to permit upward as well as inward pressure to be applied to the pot drainer against the rim of the pot when draining; and further, to provide a pot drainer which is simple in construction, cheap to manufacture and easy to operate when in use.

The pot drainer is shown by way of illustration in the accompanying drawings, in which:

Figure 1 is an edge view of a pot drainer showing how it may be applied to pots of varying size;

Figure 2 is a front view of the same;

Figure 3 is a side elevation of the same; and

Figure 4 shows how the pot drainer may be nested in a packing case.

Referring to the drawings in detail, and particularly Fig. 2, A indicates a pot drainer and B a handle secured thereto. The pot drainer is a flat plate preferably made of thin sheet metal such as aluminum or the like. The upper edge of the plate forms a straight line 2 on the chord of an arc while the other edge 3 is arcuate or circular in shape to substantially conform to the outer cylindrical surface of the largest pot to which the drainer may be applied.

Centrally of the curved or arcuate edge are formed a plurality of corrugations or openings 4, and on each side thereof is formed an inturned lug 5. The lugs serve as a partial support for the pot to be drained while the corrugations concentrate or control the flow of liquid while draining. Also the lugs and corrugations serve to reenforce or stiffen the plate, further stiffening, if desired, being obtained by flanging the upper straight edge as indicated at 6.

In actual practice it will be noted by referring to Figs. 1, 2 and 3 that the drainer may be applied to pots of varying diameter or size. For instance, it is applicable to the largest size indicated by dotted lines at 7, or the smallest size indicated at 8, and obviously to pots of intermediate size, and it should also be noted that the lugs 5—5 engage the exterior rim or surface of the pot regardless of the size of the pot. This is important as it permits a person when draining a pot to equalize the weight of the pot and its contents between two hands. That is, a person when draining grasps the handle of the pot indicated in dotted lines at 9 with one hand, and the handle B of the drainer with the other hand. Then by placing the drainer against the rim of the pot as shown in Figs. 2 and 3, and pushing upwardly and inwardly, the weight of the pot and its contents may be equalized between two hands as the lugs 5—5 engage the outer rim of the pot and furthermore prevent displacement of the drainer while draining off the liquid. The corrugations concentrate or narrow the fluid stream while draining, making it possible to drain into containers of comparatively small size. By referring to Fig. 3 it will be noted that the handle B of the drainer is bent downwardly with relation to the flat face of the drainer plate. This is important as upward pressure is thereby more readily applied when draining off the liquid. Furthermore it permits close nesting of the drainers in packing cases used for storage, shipment or otherwise as shown in Fig. 4. The handle B may be comparatively short, but obviously it must be long enough to keep the hand out of the rising steam so that burning will be prevented, and while this and other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

Having thus described my invention, what I claim and desire to secure by Letters Patent is:

1. A pot drainer comprising a generally planar plate having an arcuate margin, there being corrugations in said plate extending inwardly from said margin, a handle secured to and upstanding from one side of said plate, said handle extending radially across said margin and terminating in a grip portion outwardly of said margin, and two lugs upstanding from said margin on the other side of said plate, said lugs being substantially equidistant from said handle.

2. A pot drainer comprising a generally planar plate having an axis of symmetry and having a margin arcuate about a center on said axis, two lugs projecting from said margin and upstanding from the front of said plate, said lugs being spaced apart symmetrically with respect to said axis, and both being on one side of said center, a handle upstanding from the back of said plate, said handle being disposed symmetrically with respect to said axis and extending radially across said margin on the same side of said center and terminating in a grip portion spaced axially from the back of said plate and spaced radially outside said margin, and means on said plate between said lugs for permitting liquid drainage from a pot abutting said lugs.

JOSEPH SCHOENFELD.

REFERENCES CITED

The following references are of record in the file of this patent:

UNITED STATES PATENTS

| Number | Name | Date |
|---|---|---|
| 434,452 | Mathews | Aug. 19, 1890 |
| 554,048 | Bolus | Feb. 4, 1896 |
| 1,058,146 | Burdin | Apr. 8, 1913 |
| 2,106,453 | Ekdahl | Jan. 25, 1938 |
| 2,366,951 | Aycock | Jan. 9, 1945 |
| 2,400,642 | Hassel | May 21, 1946 |
| 2,464,843 | Becher | Mar. 22, 1949 |
| 2,466,347 | Ziemianin | Apr. 5, 1949 |

FOREIGN PATENTS

| Number | Country | Date |
|---|---|---|
| 634,631 | Germany | 1936 |
| 800,089 | France | 1936 |